June 14, 1949.　　　H. E. WEBBER　　　2,473,495
MICROWAVE WATTMETER
Filed Dec. 6, 1943　　　3 Sheets-Sheet 3
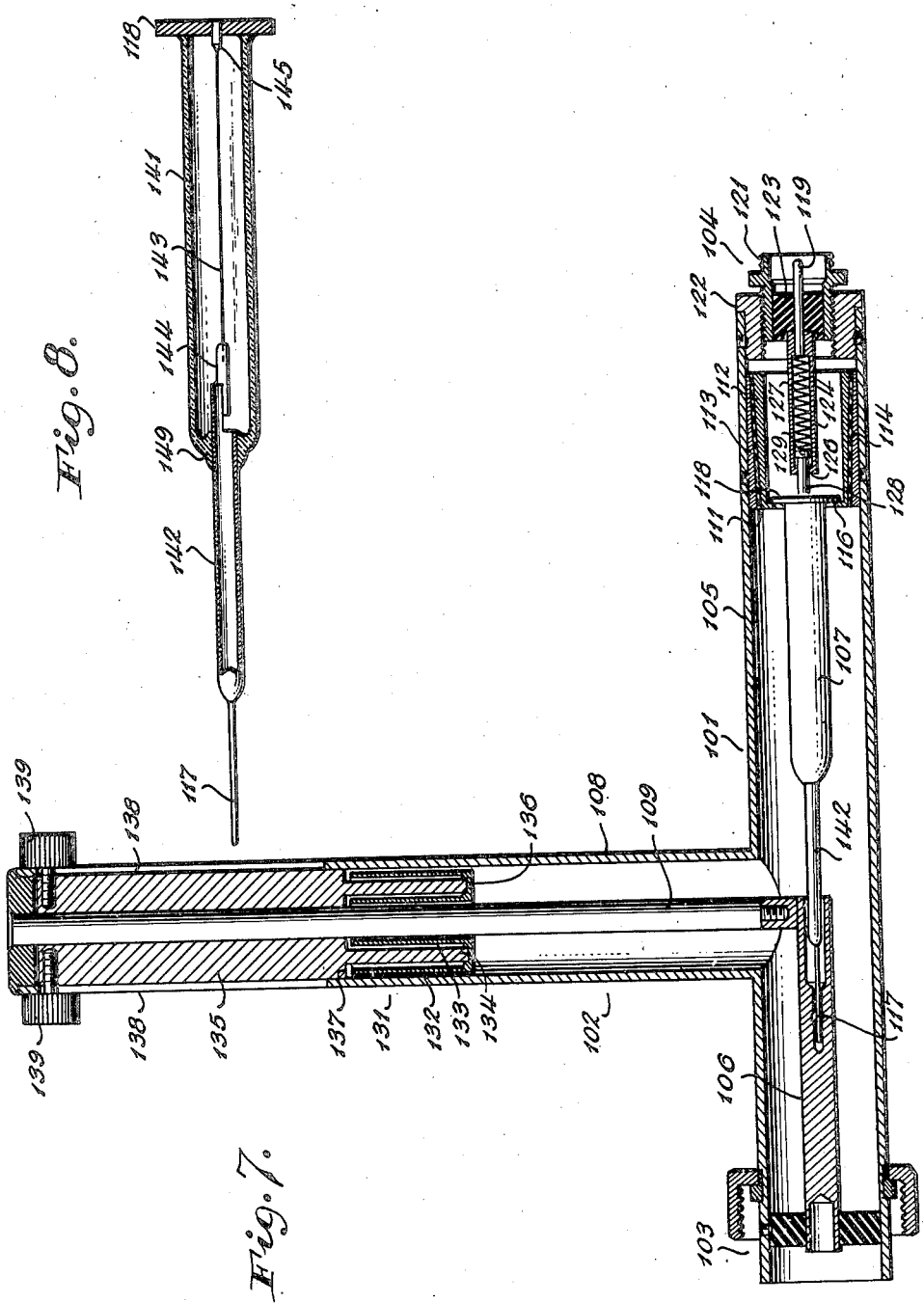
INVENTOR
HUGH E. WEBBER
BY
　Paul B. Hunter
ATTORNEY Patented June 14, 1949

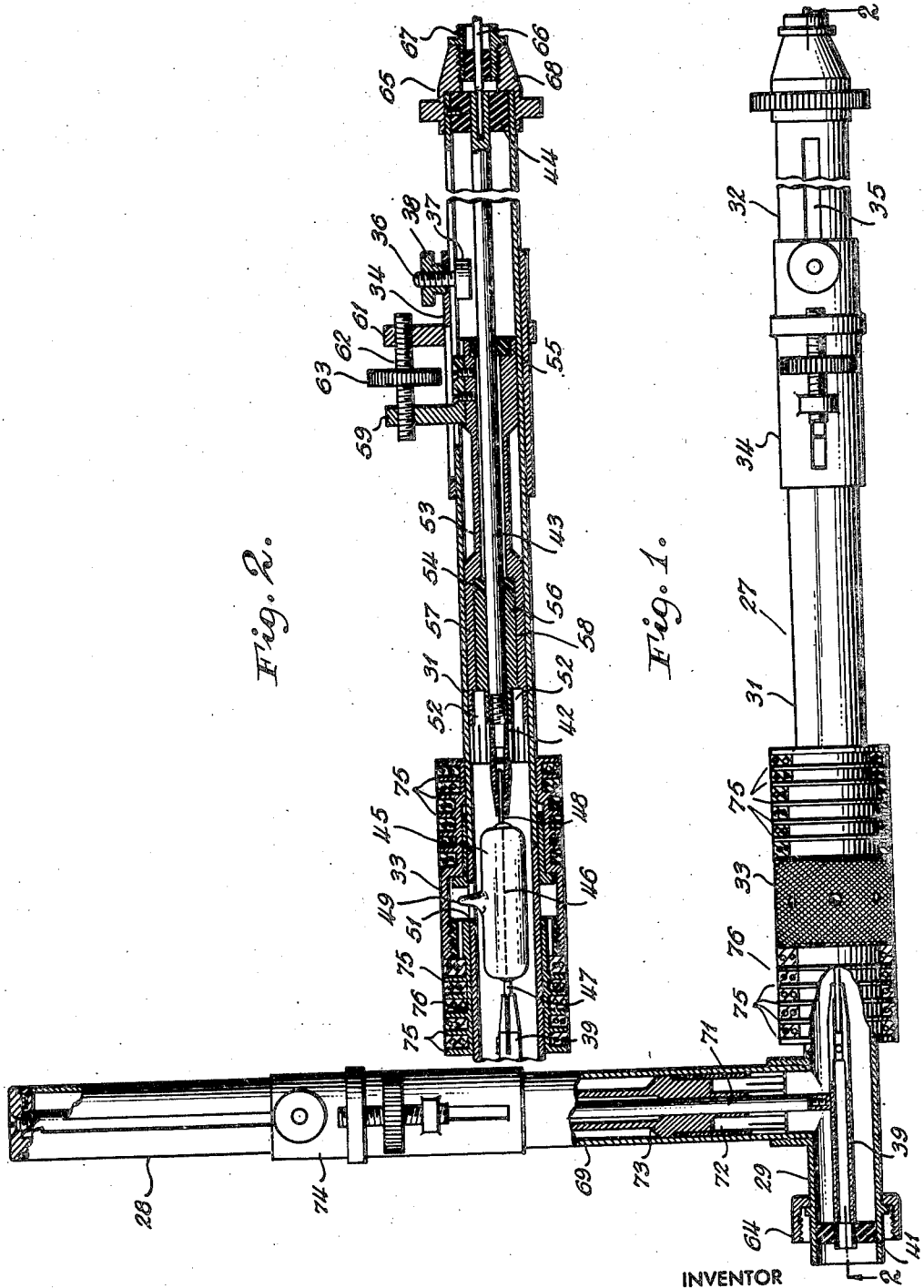

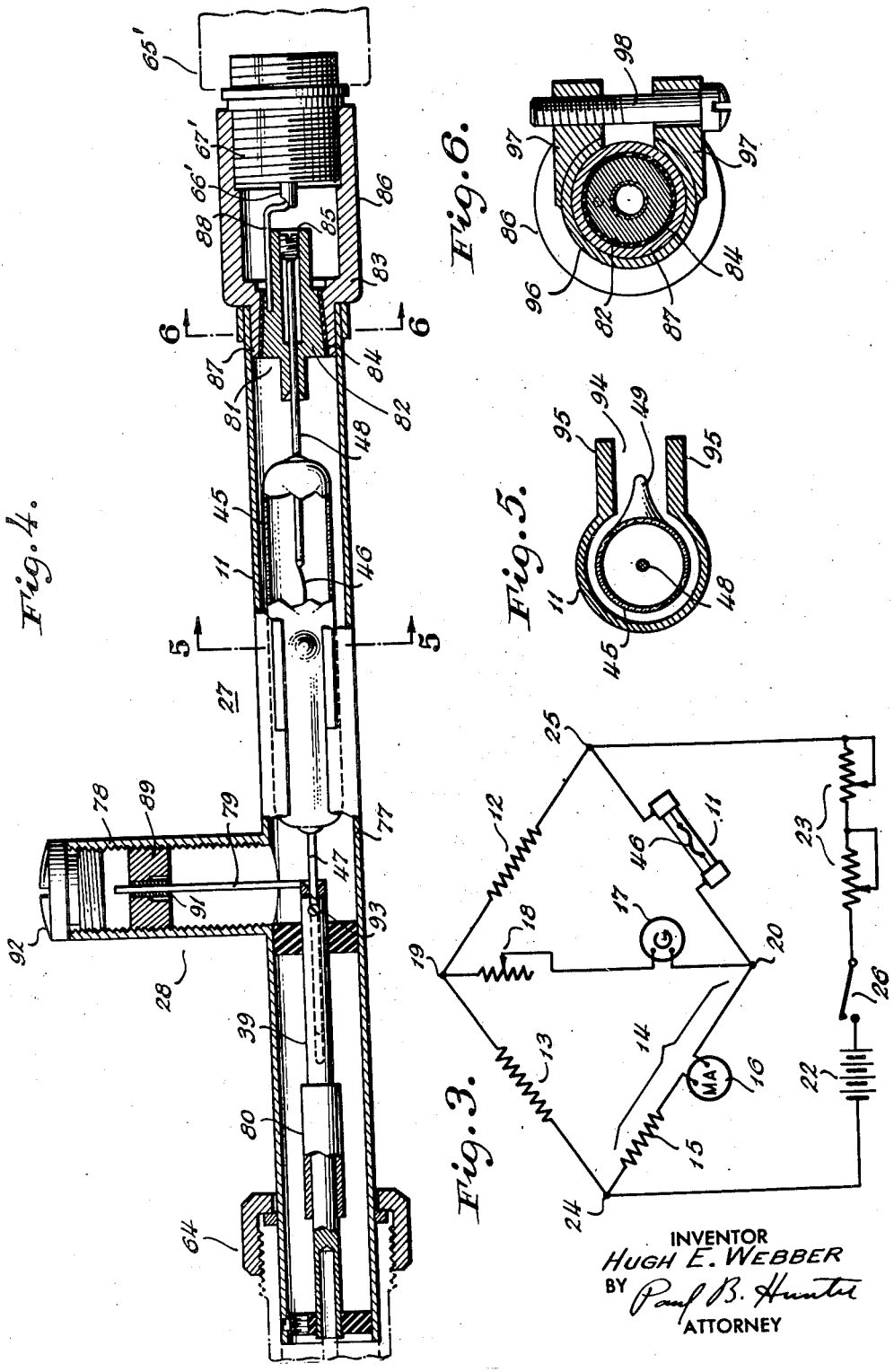

2,473,495

UNITED STATES PATENT OFFICE 2,473,495

MICROWAVE WATTMETER

Hugh E. Webber, Williston Park, N. Y., assignor to The Sperry Corporation, a corporation of Delaware Application December 6, 1943, Serial No. 513,164

13 Claims. (Cl. 171—95)

My invention relates to power measurement and concerns, particularly, methods and apparatus for the measurement of power at high frequencies such as in the microwave region.

An object of the invention is to provide a novel alternating current power wattmeter employing a concentric line structure having a portion of its inner conductor serving as a hot wire element and using a stub line for supplying direct current to the hot wire element.

A further object of the invention is to provide a bridge compensated for variation in ambient temperature of the hot wire element.

An object is to provide a concentric line hot wire holder which may readily be opened for replacement of the hot wire unit.

Another object is to provide a hot wire holder which may readily be adjusted or tuned for measuring high frequency power at different frequencies.

An additional object is to provide a power measuring bridge suitable for measurement of large amounts of power.

Further, an object of the invention is to provide a broad band wattmeter and a wire holder therefor obviating the necessity for tuning.

Other and further objects and advantages will become apparent as the description proceeds.

A method of measuring alternating current power has been proposed in which a hot wire element or Wollaston wire is fed with both alternating current and direct current, and variation in the magnitude of the alternating current power is detected by observing the variation in the direct current power required to maintain the total power dissipation of the hot wire constant. Since the resistance of the wire depends upon the temperature and the temperature in turn depends upon the power dissipation, the condition of constant total power dissipation may be maintained rather accurately by measuring the direct current resistance of the wire and maintaining it constant by varying the direct current supplied thereto. Since direct current instruments may be produced with a high degree of accuracy compared with the accuracy of alternating current instruments, particularly high frequency instruments, this substitution method enables accurate measurements of alternating power to be made by direct-current instruments.

For readily maintaining the resistance of the hot-wire constant it may be made one arm of a direct-current bridge or a bridge supplied with low-frequency alternating-current equivalent to direct-current in comparison with radio-frequency current.

In order that microwave energy may be fed to the wire, and a direct current connection may also be made thereto without interfering with the microwave circuit, a suitable hot wire holder of the concentric line type, for example, is provided. The wire is mounted within the outer cylinder of a concentric line, and the wire itself forms a part of the inner rod or conductor. In order to avoid reflection of microwave energy or high standing wave ratios, the line is either tuned to eliminate reflections from the hot wire or the hot wire is mounted at the current anti-node or loop and a shorting stub is provided for bringing in a direct current connection without interposing any alternating current impedance.

When the broad band effect is desired, that is, when it is desired to measure power accurately over a range of frequencies without readjustment of the apparatus, the hot wire is preferably mounted as close as possible to a point in the concentric line which is a dead short with respect to high frequency current.

For high power measurements the hot wire is mounted in a bulb filled with hydrogen, and for very low power measurements the wire is drawn to a very fine diameter and prepared by special methods to avoid rupture of such a fragile wire during the process of mounting. For a given microwave band width both length and diameter of the hot wire is limited to make certain that direct-current and radio-frequency resistances are equal.

This application is related to my Patents Nos. 2,419,613; 2,424,596; 2,414,499; 2,468,793 and 2,464,277 and to application Serial No. 429,508, filed February 4, 1942, in the names of William W. Hansen, John R. Woodyard and Edward L. Ginzton.

A better understanding of the invention will be afforded by the following detailed description considered in conjunction with the accompanying drawings, in which Fig. 1 is a view partially in section of a microwave wattmeter having a wire holder of the concentric line type represented as partially cut by a plane passing through the axes of both the main line and the lateral shorting stub;

Fig. 2 is a longitudinal section of the apparatus of Fig. 1, represented as cut by a plane 2—2 through the axis of the main line and perpendicular to the plane defined by the axis of the main line and the shorting stub in Fig. 1;

Fig. 3 is a circuit diagram of a power measuring bridge in which a hot wire mounted in a concentric line may be employed as one arm of the bridge;

Fig. 4 is a view, mainly a longitudinal section, of a wire holder for use in a relatively narrow range of frequencies;

Fig. 5 is a cross-sectional view of a portion of the apparatus of Fig. 4, cut by a plane 5—5 as seen when looking in the direction of the arrows;

Fig. 6 is a corresponding cross-sectional view of a portion of the apparatus of Fig. 4, cut by a plane 6—6;

Fig. 7 is a cross-sectional view of a hot wire holder in which the hot wire element is mounted at a current anti-node;

Fig. 8 is an enlarged detail view of the hot wire unit shown in Fig. 7.

Like reference characters are utilized throughout the drawings to designate like parts.

Fig. 1 illustrates a wire holder and a hot wire suitable for use in a bridge circuit, such as shown in Fig. 3. One arm 11 of the bridge represents the hot wire holder of Fig. 1. The bridge shown in Fig. 3 comprises in addition to the hot wire unit 11, a compensating resistor 12, a standard bridge arm 13 and a fourth bridge arm 14, consisting of a resistor 15, and a current responsive instrument such as a milliammeter 16 in series. A conventional null-indicating galvanometer 17 and a sensitivity-adjusting rheostat 18 are connected in series between conjugate points 19 and 20 of the bridge to form a conventional diagonal bridge arm. A source of direct current 22 in series with rheostats 23 is connected to the remaining conjugate points 24 and 25 of the bridge. As shown, a switch 26 is connected in series with the power current source 22.

The resistances of the bridge arms are so chosen that at a predetermined temperature of the hot wire in unit 11, the bridge will be in balance and this temperature is usually the one existing when the maximum safe power is being supplied to the hot wire unit 11. For maximum sensitivity, the resistances of the four arms may be made substantially equal. The resistance of the resistor 15 is so chosen that the sum of its resistance and the resistance of the milliammeter 16 will equal the desired resistance for the bridge arm 14.

When the resistances of the four arms are made equal the total direct current power input to the bridge may readily be calculated from the measured current input and the resistance of the arms. The direct power consumption in unit 11 is then one-fourth the power input. However, by making the resistances of the arms of 11 and 14 equal regardless of the resistances chosen for the arms 12 and 13, and connecting the milliammeter 16 in series with the resistor 15 to form the arm 14, direct current power consumption in the arm 11 may be calculated directly from the reading of the instrument 16 and the resistance of the arm 14.

The wire holder shown in Fig. 1 comprises a main concentric line 27 consisting of an outer cylinder and an inner rod and a stub line 28 also consisting of an outer conductor and an inner rod. Both lines 27 and 28 are made adjustable in effective electrical length for tuning purposes. The outer conductor of the main line 27 comprises tubular members 29 and 31. The members 29 and 31 are arranged to be separable but are designed to be fastened together in a fixed relation during operation of the apparatus by a threaded sleeve coupling 33.

The inner conductor of the main line 27 comprises a hollow rod 39 secured at the lefthand end of the tubular member 29 by an insulating bushing 41, a hollow rod 42, threaded to a solid rod 43 extending to the righthand end of the tubular member 31 and supported at the righthand end by an insulating bushing 44, and a barretter wire or a Wollaston wire 46 mounted in an evacuated tube 45 to form the unit 11 with wire terminals 47 and 48 making contact with the tubular rods 39 and 42, respectively.

The bulb 45 of the hot wire element 11 is shown with a tip 49 at the side resulting from the evacuation and sealing off of the bulb. To provide space for the tip 49, the connector sleeve 33 is therefore made of sufficient diameter and an opening 51 is left at one side of the tubular member 29 to receive the tip 49.

For varying the electrically effective length of the line 27, a slidable line closer is provided comprising wipers 52 adapted to make electrical connection with the inner surface of the tubular member 31, carried by a hollow member 53 which is slidably supported by the rod 43 through insulating bushings 54 and 55. For further supporting the member 53, the rod 43 is provided with a sleeve 56 secured thereto, and for insulating an enlarged portion 57 of the hollow rod 53 from the sleeve 56 a cylinder of insulating material 58 is interposed between the members 56 and 57.

For setting the member 53 in longitudinal position it is secured to a wavelength adjusting sleeve 34 which is in turn adapted to be adjustably secured to the tubular member 31 by means of a screw 36 reaching through a slot 35 in the tubular member 31 with a head 37 inside the tubular member 31 and a securing nut 38 adapted to bear against the outer surface of the wavelength adjusting sleeve 34.

For making finer adjustments in wavelength a micrometer adjusting head is provided, comprising a post 59 secured to the righthand end of the member 53, for example, by means of machine screws as shown; a post 61 integral with the sleeve 34 and a right and lefthand screw 62 threaded into openings in the posts 59, 61 and carrying a knurled adjusting head 63.

For permitting microwave energy to be fed to the line 27, and to pass through the barretter wire 46 from another concentric transmission line (not shown) a conventional concentric line coupling 64 is provided at the lefthand end of the line 27. It will be understood that such a coupling provides for making electrical connection to the outer conductor 29 and the inner conductor 39, from corresponding elements of the supply line (not shown).

For making direct current connections with the barretter wire 46, a coupling unit 65 is provided comprising an inner terminal 66 making electrical contact with the internal rod 43 of the concentric line 27, and an outer screw thread terminal 67 making electrical connection with the outer conductor of the tubular member 31 through a metallic member 68. As previously mentioned the insulators 44, 54 and 58 are provided to prevent creating a direct-current short circuit between the tubular member 31 and the inner rod 43. In order that a direct-current return path from the lefthand terminal 47 of the barretter wire 46 may be made through the outer conductor of the concentric line without short-circuiting or producing reflections in the high frequency circuit, the stub line 28 is provided.

The stub line 28 comprises an outer conductor 69, which is electrically connected to the outer conductor members 29 and 31 of the main line 27, and an inner conductor rod 71, which is electrically connected to the inner conductor member 39 of the main line 27. For tuning out any reflections which might tend to be caused by the presence of the wire 46 in the inner conductor of the line 27, and for making the electrical length of the stub line 28 such as to interpose no impedance in the main line 27, the stub line 28 is so constructed that it may be varied in wavelength in a manner similar to that described for the main line 27. Thus, the line 28 is also provided with spring contact members 72 carried by a member 73 and a longitudinal adjusting sleeve 74 provided with coarse and micrometer adjustments as in the case of the sleeve 34.

It will be understood that when the electrical wavelength of the line 28 is equal to an odd number of quarter-waves of the microwave energy fed to the line 27, a direct connection between the inner and outer conductors of the upper end of the stub line 28 will have no effect on the main line 27. In order to avoid reflections from the righthand end of the line 27 back toward the input end 64 the righthand end of the electrical portion of the line 27 should constitute a short circuit with respect to radio frequency. This is accomplished by making the conducting members 57 and 56 and the insulating sleeve 58 between them of sufficient length to form a by-pass condenser. Therefore, with respect to high frequency, the members 57 and 56 may be considered to be electrically connected.

A direct-current circuit may be traced from the direct-current terminal 66 through the rod 43, the barretter wire terminal 48, the wire 46, the wire terminal 47, the inner conductor 39, inner conductor 71, the member 73, the contact fingers 72, the outer conductor 69 of the stub line 28, the outer tubular member 29 of the main line 27, the outer tubular member 31 thereof, the metallic fitting 68 and back to the second direct-current terminal 67.

For the purpose of compensating the bridge of Fig. 3 for variations in ambient temperature, which would tend to vary the resistance of the wire 46 for a predetermined power dissipation, a compensating resistor may be mounted in close proximity to the wire 46 so as to be subjected to substantially the same ambient temperature. This resistor may be one of the arms of the bridge, for example, the arm 12 as previously mentioned.

For mounting the resistor 12 in close proximity to the wire 46, a resistor spool may be formed around the barretter wire and bulb 45, comprising retaining discs or flanges 75 formed in a sleeve 76 and in the coupling sleeve 33, see Figs. 1 and 2. Resistance wire of suitable size is wound between the flanges 75 to produce a total resistance of the value desired for the arm 12 of the bridge. Since the wire of the compensating resistor is not protected by enclosure in an evacuated bulb, it will be understood that the wire will need to be relatively heavy and therefore made of considerable length in comparison with the length and thickness of the wire 46.

When a power measurement is to be made, before the microwave energy is supplied to the coupling 64, the bridge of Fig. 3 is balanced by adjustment of the rheostats 23 until the current flowing through the barretter wire 46 is such as to produce a standard resistance of the bridge and causing null indication of the galvanometer 17. The milliammeter 16 is then read to ascertain the direct-current power consumption of the arms 11 or 14. Thereupon the direct-current power supply to the bridge is reduced to prevent overloading and burning out of the wire 46, and microwave power is supplied to the wire 46 through the connection 64. The rheostats 23 are again adjusted until a balance is obtained by the null indication of the galvanometer 17. The milliammeter 16 is again read and the value of the alternating power input is then determined by the difference between the direct power inputs to the wire 46 before and after admission of the alternating current power.

When relatively little frequency variation in the microwave input is to be expected, the longitudinal adjustment of the main line 27 is not needed and the stub line 28 is utilized only for making a direct current return connection from the lefthand terminal 47 of the barretter wire 46. For example, as shown in Fig. 4, the wire holder may take the form of a concentric line unit having a main line 27 and stub line 28. The main line 27 comprises an outer cylinder 77, the lefthand inner rod 39 and the barreter wire unit 11; the stub line 28 comprises an outer cylinder 78 and an inner rod 79. A longitudinally slidable, adjustable-ratio impedance-matching transformer or matching sleeve 80 may be provided.

For the purpose of shorting the righthand end of the main line 27 with respect to alternating current a by-pass condenser 81 is formed at the righthand end of the main line 27. The by-pass condenser 81 comprises a metallic fitting 82 with a tapered or conical outer surface and a second fitting 83 with a tapered inner surface mating the outer surface of the fitting 82, but separated therefrom by insulating sheet material 84 to form a condenser. The fitting 82 is electrically connected to the terminal 48 of the wire 46 by a suitable means such as by means of an abutting screw 85, and the fitting 83 has a hollow portion 86, adapted to receive a conventional direct current coupling 65', and a neck portion 87 fitting inside and making electrical contact with the righthand end of the outer conductor member 77. The direct current coupling 65' includes an outer threaded terminal 68', making electrical contact with the member 83, and an inner terminal 66' connected by a conductor 88 to the fitting 82.

For adjusting electrical length of the stub line 28 the inner surface of the cylinder 78 is threaded and a threaded nut or plug 89 is provided which carries contact fingers 91, engaging the inner conductor rod 79. A closing cap 92 may be provided. It will be understood that the plug 89 is provided with recesses (not shown) whereby a suitable tool may be utilized for rotating the plug 89 in the threaded inner surface of the cylinder 78.

In this case the direct-current electrical circuit from the inner connector teminal 66' takes place through the conductor 88, the fitting 82, the barretter wire terminal 48, the barretter wire 46, its terminal 47, the inner conductor 39, the inner conductor 79, contacts 91, plug 89, cylinder 78 and the outer cylinder 77 back to the neck portion 87 of the fitting 83 and the threaded terminal 67'.

To permit mounting and replacing the barretter wire unit 11, the fitting 83 is made removable, the inner conductor 39 is made hollow at the end and it is provided with a set screw 93 for receiving and fastening the terminal 47 of the Wollaston wire 46. An opening (not shown) is provided in the cylinder 77 to provide access to the screw 93 by means of a screwdriver. To provide space for the top 49 of the bulb 45, a channel 94 (Fig. 5) is provided in the side of the hollow cylinder 77, and the sides of the slots 94 are provided with longitudinal ribs 95. For securing the fitting 83 to the righthand end of the hollow cylinder 77 a clamp (Fig. 6) is provided comprising a split ring 96 secured to clamping jaws 97 cooperating with a clamping screw 98.

When broad band characteristics are required for the wattmeter, a wire holder may be employed in which the barretter wire is mounted at the current anti-node or loop in a concentric transmission line. As illustrated in Fig. 7 the wire holder comprises a concentric transmission line 101 and a lateral stub 102 with a conventional input connection 103 at the lefthand end of the line for receiving power from a concentric line (not shown), and a direct current connector 104 at the righthand end.

The main line 101 comprises a hollow-cylindrical outer conductor 105, an inner conductor rod 106 and a barretter wire unit 107. The lateral stub 102 comprises a hollow-cylindrical outer conductor 108 joined to the cylinder 105 and a center rod 109. For electrically insulating the righthand end of the hot wire unit 107 from the outer conductor 105, with respect to direct current while maintaining a short circuit at the righthand end of the line 101 with respect to alternating current, a by-pass condenser 111 is formed at the righthand end of the line 101. Such a condenser may comprise a pair of concentric cylinders 112 and 113 with mating tapered adjacent surfaces separated by a sheet of insulating material 114. The outer member 113 is in electrical contact and joined to the inner surface of the outer cylinder 105; and the inner member 112 is provided with an internal flange 116 for making electrical contact with the righthand end of the barretter wire unit 107.

The barretter wire unit 107, which will be described in greater detail hereinafter in connection with Fig. 8, includes a lefthand terminal 117 fitting into a suitable axial opening in the rod 106 and a righthand terminal or metallic end plate 118 adapted to fit against the flange 116 of the condenser member 112. The direct current connector 104 includes an inner prong terminal 119 and an outer threaded terminal 121. For securing the outer threaded terminal 121 in the righthand end of the hollow cylinder 105 and making electrical connection therebetween a metallic bushing 122 is provided. A pierced insulating plug 123 is provided for supporting the prong 119 within the outer threaded terminal 121.

For holding the plate 118 of the wire 107 against the flange 116 in the by-pass condenser 111, and for making an electrical connection between the connector prong 119 and the end plate 118, a spring unit 124 is provided comprising a tube 125 provided with internal flange 126 at the lefthand end, secured at the righthand end to the insulator plug 123 and containing a compression spring 127, and a spring-pressed contact pin 128 protruding the opening at the lefthand end of the tube 125 and having a head 129 abutting the spring 127 within the tube 125.

For terminating the stub line 102, a wave trap 131 is provided, comprising a pair of concentric hollow cylinders 132 and 133, internally and externally spaced from, but electrically and mechanically connected to a hollow cylindrical extension 134 of a hollow longitudinally slidable plug 135 fitting the inner surface of the hollow cylinder 108. As shown, the hollow cylinders 132 and 133 are electrically connected to the hollow cylinder 134 at the lower end thereof by means of an annular member 136. The hollow cylinders 132 and 133 are spaced from the inner conductor rod 109 and the outer conductor hollow cylinder 108 as well as from the hollow cylinder extension 134, and are spaced also from shoulders 137 in the plug 135. The cylinders 132 and 133 are made substantially one-quarter wave in length for the average wavelength of microwave frequency to be measured or one-half wavelength from the radio frequency end (over one-quarter wavelength section and down to bottom or dead short again) in order to provide a complete termination at the lower end of the plug 135.

To permit adjustment of the electrical length of the stub line 102 in terms of wavelengths, the hollow cylinder 108 may be provided with slots 138, and screws 139 cooperating with the slots 138 and threaded into plug 135 may be provided. If the proper length of the stub line 102 is determined beforehand, it will not be necessary to provide such adjustment, and the barretter wire unit 107 will absorb microwave energy over a range of frequencies extending 40% above and below the mid band frequency for which the apparatus is designed without producing any reflections. As shown, the barretter wire unit 107 is entirely symmetrical with respect to the longitudinal axis through its terminal rod 117, has no laterally extending sealing tip and utilizes a flat end plate terminal 118. This shape and structure facilitates the mounting arrangements, permits the simplification of the construction of the outer cylinder 105 and also makes it possible to connect the righthand end of the power-absorbing wire of the unit 107 directly at the current anti-node.

As shown in greater detail in Fig. 8, the unit 107 comprises a cylindrical glass bulb 141 closed at the righthand end by a metallic end plate 118, having a sealed metallic tube 142 coaxially joined thereto at the lefthand end, and containing a barretter wire 143. For completing the electrical connections between the lefthand rod terminal 117 and the end plate 118 through the barretter wire 143, the wire 143 is provided with terminal lugs 144 and 145 welded to the ends of the wire 143 and in turn welded or soldered to the tube 142 and the end plate 118, respectively.

The glass of which the tube 142 is composed, and the metal of which the end plate 118 and the tube 142 are composed are preferably so chosen as to have the same temperature coefficient of expansion. For example, relatively low temperature coefficient of expansion material may be employed such as an alloy known as Kovar alloy, for the elements 118 and 142, and a glass such as that known as 9X or 705 glass may be employed for the tube 141.

As many changes could be made in the above construction and many apparently widely different embodiments of this invention could be made without departing from the scope thereof,

What is claimed is:

1. A hot wire holder for a high frequency wattmeter, comprising in combination, a concentric transmission line having an outer hollow cylindrical conductor, an inner conductor with a gap therein, a barretter wire unit to complete the inner conductor, a stub line comprising an outer hollow cylindrical conductor laterally extending from and electrically connected to the outer conductor of the first-mentioned line, an inner conductor electrically connected to the inner conductor of the first-mentioned line, means for closing one end of the line with respect to high frequency currents, but insulating the inner and outer conductors with respect to direct current, and means for supplying high frequency energy to the other end of the line.

2. Apparatus as in claim 1, with means for adjusting the electrical lengths of the main line and the stub line.

3. Apparatus as in claim 1 in which the outer hollow cylindrical conductor of the main line is separable and a coupling sleeve is provided for removably joining the separable portions to provide for installation and replacement of the barretter wire unit.

4. Apparatus as in claim 1 having a spool formed around the portion of the outer cylindrical conductor surrounding the barretter wire unit for receiving ambient temperature compensating resistance wire.

5. An alternating current power-measuring bridge for high frequency measurements, comprising in combination, a transmission line, a pair of resistors connected in series to form two bridge arms, a current-responsive instrument, a third resistor connected in series with said current-responsive instrument to form a third bridge arm, and a resistor within said transmission line, the resistance of which depends upon measurement conditions forming a fourth bridge arm, means for supplying electrical energy to said bridge for maintaining the resistance of said fourth arm substantially constant, the first two resistors having a fixed ratio while simultaneously the third and fourth bridge arms have the same ratio for a predetermined measurement condition whereby the power consumption in the fourth bridge arm may be calculated from the current flow in the current-responsive instrument and the resistance of the third bridge arm when a balanced condition is maintained.

6. A hot wire unit holder for a microwave wattmeter, comprising a transmission line of the concentric type, and a stub line, the concentric line comprising an outer conductor in the form of a hollow cylinder, an inner conductor extending coaxialy within said cylinder for a portion of the length thereof, a hot wire element mounted within the said cylinder forming a continuation of said inner conductor and a by-pass condenser having an inner member electrically connected to said hot wire unit, an outer member electrically connected to the outer cylinder, and an insulating sheet between said two units, said insulating unit cylinder having actual length at least comparable with the diameter of the cylinder whereby a low-impedance radio-frequency path is provided at the end of the transmission line between the inner and outer conductors, but said conductors are insulated with respect to direct current.

7. A wire holder for a broad band microwave wattmeter of a barretter wire type, comprising a transmission line having inner and outer conductors, a by-pass condenser at one end of the line and said inner conductor extending only part way toward the end of the line to provide space for interposing a barretter wire unit, and a tuning stub extending laterally from the transmission line at the end of the inner conductor of the transmission line.

8. Apparatus as in claim 7 wherein the tuning stub is terminated by a wave trap.

9. An alternating current power-measuring system comprising a transmission line having inner and outer conductors, a by-pass condenser at one end of the line, a power-absorbing resistance wire mounted within said line adjacent said by-pass condenser and constituting a portion of the inner conductor thereof, and a tuning stub extending laterally from said transmission line, said tuning stub comprising a hollow outer conductor, an inner conductor rod substantially centrally disposed therein and extending throughout the length of said outer conductor, and a hollow plug adjustably slidable in said outer conductor and on said inner conductor for making sliding electrical contact therewith, said plug having a hollow cylindrical extension surrounding said rod, a pair of concentric hollow cylinders internally and externally spaced from said hollow cylindrical extension and carried by the end thereof, said cylinders being also spaced from the rod and from the outer conductor as well as from said plug, whereby a non-contacting termination for the line is formed at the end of said hollow cylindrical plug extension.

10. Apparatus as in claim 9, wherein the hollow cylinders are substantially a quarter-wave in length for the average frequency for which the transmission line is designed.

11. A high-frequency wattmeter having a concentric transmission line comprising an outer and inner conductor, a barretter wire unit interposed therein constituting a portion of said inner conductor and a tuning stub line extending laterally from said transmission line having an outer hollow conductor, and an inner conductor rod extending throughout said outer hollow conductor, said termination comprising a hollow supporting member surrounding said rod and extending toward one end thereof, a pair of concentric hollow cylinders internally and externally spaced from, but electrically and mechanically connected to the hollow supporting member at one of their ends, and so dimensioned as to be spaced also from the center rod and outer conductor, the concentric hollow cylinders being insulated from said supporting member at their ends opposite from the end at which they are supported and means for moving said supporting member and said cylinders for varying the electrical length of said transmisson line.

12. Apparatus as in claim 11, wherein the concentric hollow cylinders are substantially one-quarter wave in length for the average frequency for which the coaxial line is designed.

13. In a microwave measuring instrument, the combination of a section of coaxial transmission line short-circuited at one end for high frequency waves, said line comprising an inner conductor and a tubular outer conductor, a resistance element connected in series with said inner conductor adjacent to said end, adjustable susceptance means connected across said line at the end of said resistance element remote from said one end, said line having a fixed length adjacent said element, said susceptance means cooperating with said fixed length to match the conductance of said element with the characteristic conductance of said line at the end of said fixed length remote from said element, fixed susceptance means on said inner conductor at said last end.

HUGH E. WEBBER.

REFERENCES CITED

The following references are of record in the file of this patent:

UNITED STATES PATENTS

| Number | Name | Date |
|---|---|---|
| Re. 20,859 | Potter | Sept. 13, 1938 |
| 1,531,955 | Kingman | Mar. 31, 1925 |
| 1,590,420 | Chubb | June 29, 1926 |
| 1,667,624 | Corson et al. | Apr. 24, 1928 |
| 2,030,179 | Potter | Feb. 11, 1936 |
| 2,081,044 | Runaldue | May 18, 1937 |
| 2,109,880 | Dow | Mar. 1, 1938 |
| 2,201,472 | Browder et al. | May 21, 1940 |
| 2,233,546 | Meulendyke | Mar. 4, 1941 |
| 2,262,134 | Brown | Nov. 11, 1941 |
| 2,284,379 | Dow | May 26, 1942 |
| 2,284,529 | Mason | May 26, 1942 |
| 2,294,881 | Alford et al. | Sept. 8, 1942 |
| 2,314,764 | Brown | Mar. 23, 1943 |
| 2,315,671 | Tawney | Apr. 6, 1943 |
| 2,373,233 | Dow et al. | Apr. 10, 1945 |
| 2,399,481 | George | Apr. 30, 1946 |
| 2,399,674 | Harrison | May 6, 1946 |
| 2,400,777 | Okress | May 21, 1946 |
| 2,413,171 | Clifford et al. | Dec. 24, 1946 |

FOREIGN PATENTS

| Number | Country | Date |
|---|---|---|
| 475,287 | Great Britain | Nov. 17, 1937 |
| 658,571 | Germany | Apr. 12, 1938 |